June 26, 1923.
M. J. WEBER
AUTOMATIC SCALE
Filed Sept. 27, 1920   3 Sheets-Sheet 1
1,460,087
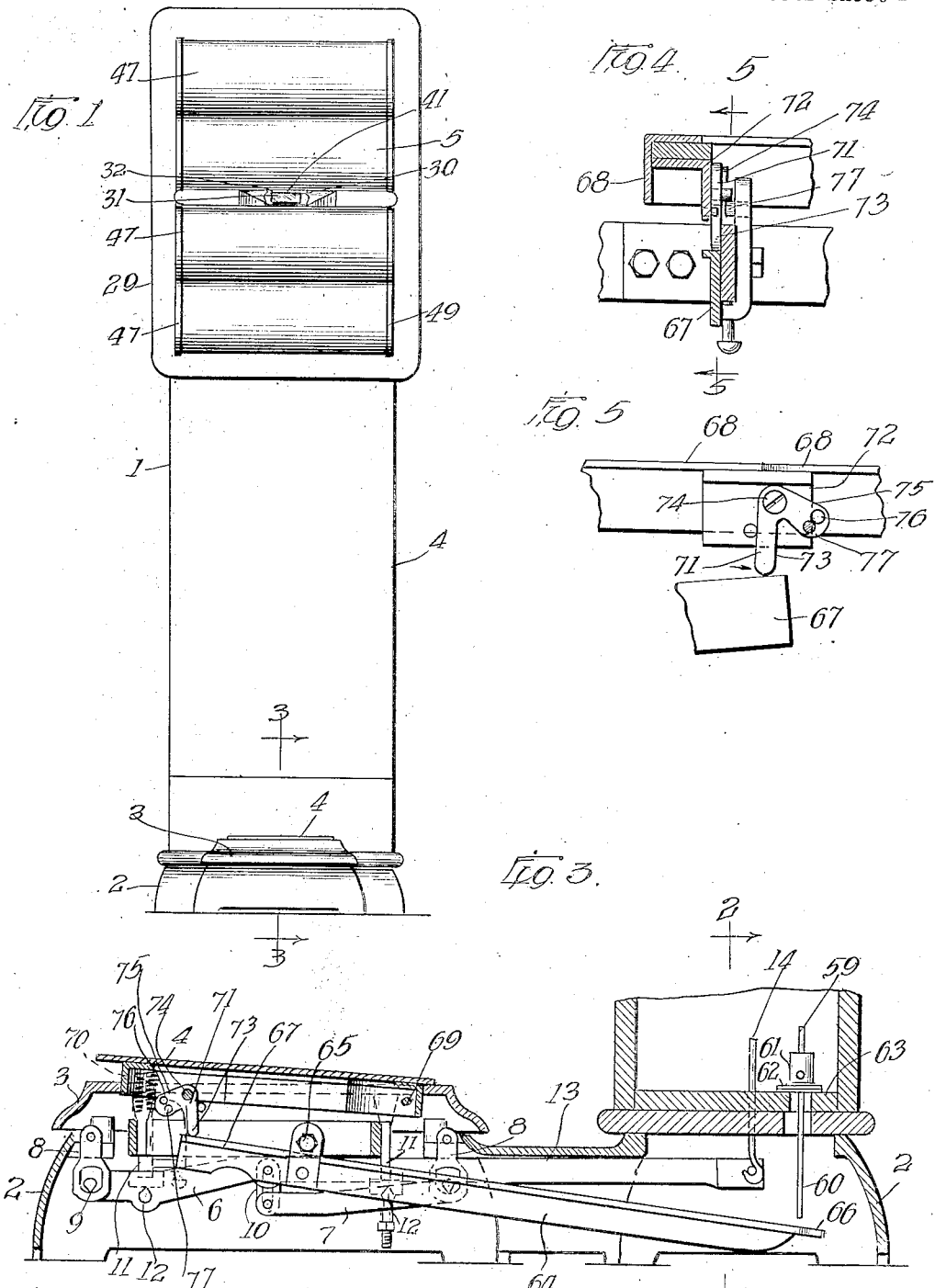

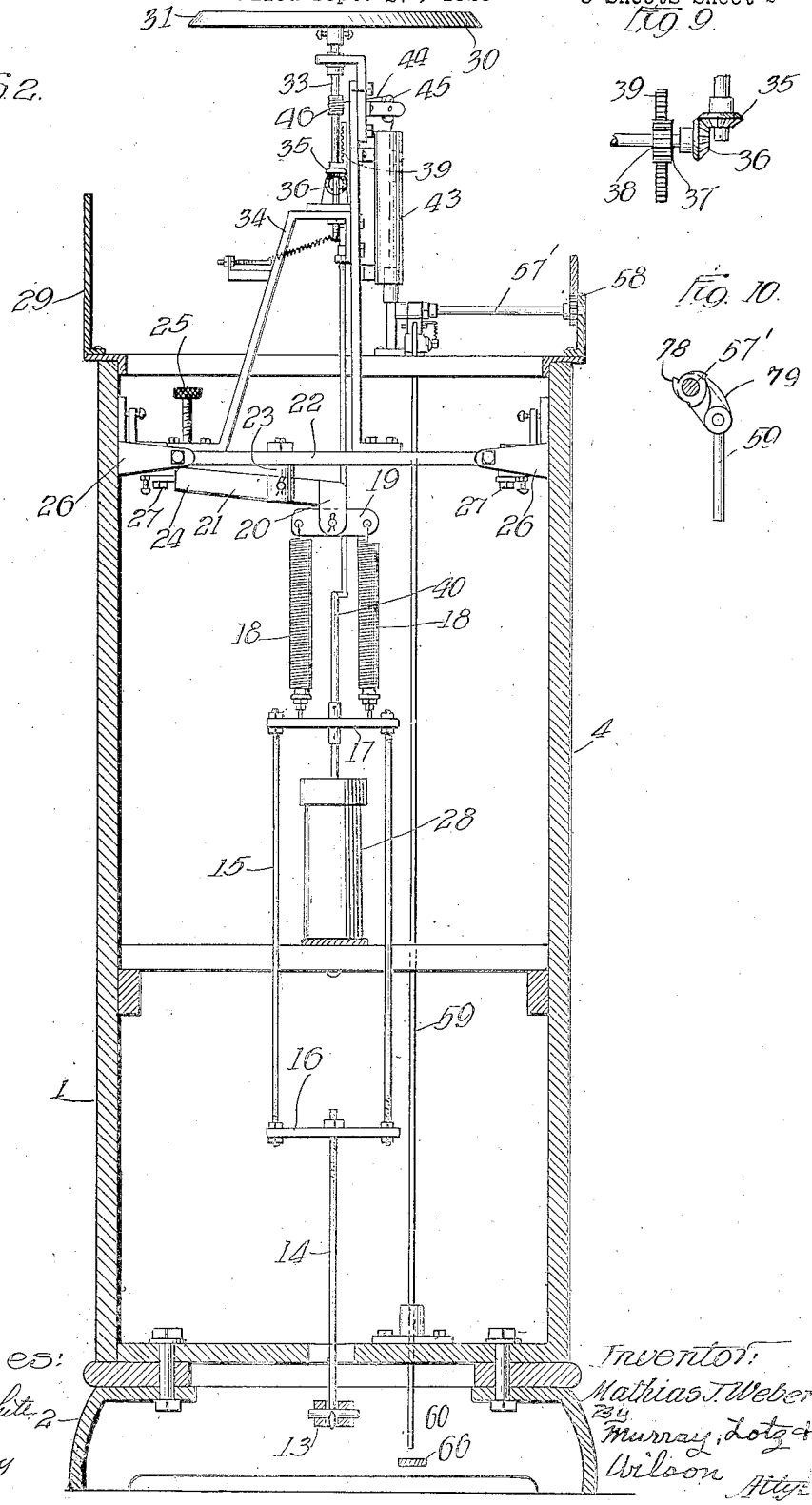

June 26, 1923.
M. J. WEBER
AUTOMATIC SCALE
Filed Sept. 27, 1920
1,460,087
3 Sheets-Sheet 3
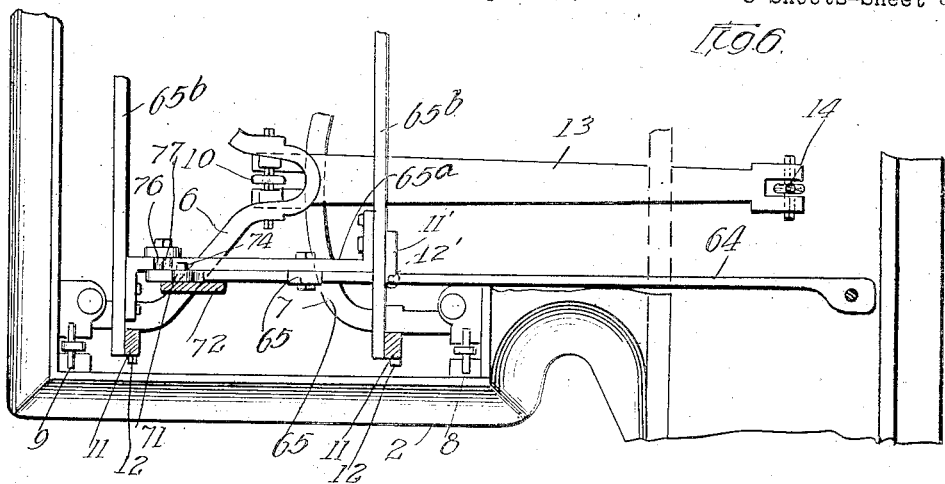
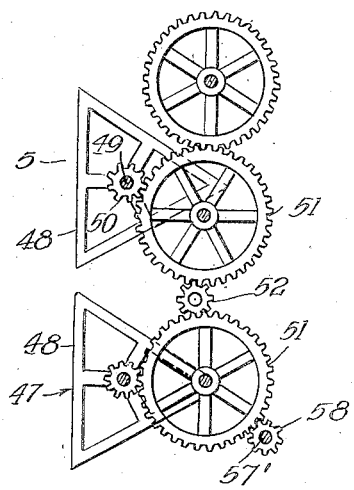
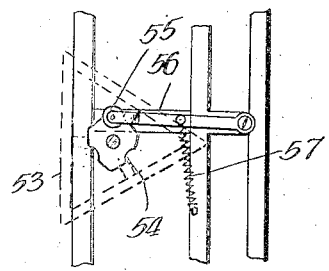
Witnesses
Harry R. Leekell
W. P. Kilroy
Inventor:
Mathias J. Weber.
By Murray Lotz & Wilson
Attys.

Patented June 26, 1923.

1,460,087

UNITED STATES PATENT OFFICE.

MATHIAS J. WEBER, OF CHICAGO, ILLINOIS, ASSIGNOR TO CONTINENTAL SCALE WORKS, OF CHICAGO, ILLINOIS, A CORPORATION OF ILLINOIS.

AUTOMATIC SCALE.

Application filed September 27, 1920. Serial No. 412,961.

*To all whom it may concern:*

Be it known that I, MATHIAS J. WEBER, a citizen of the United States, and a resident of Chicago, in the county of Cook and State of Illinois, have invented certain new and useful Improvements in an Automatic Scale, of which the following is a specification.

My invention relates to improvements in automatic weighing scales and has special reference to the combination with such scales of means for effecting mechanical operation of associated devices.

The object of my invention is to provide a scale of the character described which shall be arranged to supply power to an associated device such as a movable advertising device without affecting the accuracy of the weight indications.

An important feature of my invention is an arrangement which permits the applied weight to first effect the mechanical movements desired and which is thereafter completely disconnected from the mechanically operated device so that the scale is free to accurately indicate the applied weight.

Other important features of my invention relate to means for reducing friction to a minimum and for eliminating the detrimental effect of loose connections, all of which assist in accuracy of indications.

My invention will be more readily understood by reference to the accompanying drawings forming part of this specification, and in which:—

Figure 1 is a front elevation of a platform scale embodying my invention;

Figure 2 is a fragmentary vertical section of the device substantially on the line 2—2 of Figure 3;

Figure 3 is a central vertical section on the line 3—3 of Figure 1;

Figure 4 is a fragmentary vertical section on the line 4—4 of Figure 3;

Figure 5 is a fragmentary vertical section on the line 5—5 of Figure 4;

Figure 6 is a fragmentary plan view of the base showing the operating levers;

Figure 7 is a fragmentary side elevation of the advertisement display apparatus;

Figure 8 is a fragmentary side elevation showing the means for setting and holding the display device in position so that the advertisement can be read; and Figure 9 is an enlarged detail of the gearing by which the weight indicating mechanism is operated; and Figure 10 is an enlarged detail of a part of the mechanism for moving the display device.

In said drawings, 1 illustrates a scale having a base 2 and provided with a platform 3 upon which a person can stand to be weighed.

At the rear end of the base a casing 4 rises, in the upper part of which is arranged an advertising display device 5 at a suitable height so that the advertisements can be readily read by a person standing on the platform.

The idea involved in this invention is to cause a movement of the advertisement device as a person steps on to the platform so that his attention will be called to said advertisement, and yet prevent the operating of the advertising device affecting the accuracy of the weight indications.

The fundamental idea is carried out by providing an element which will be moved by the initial application of the weight to the scale platform and which, having accomplished its function, will be mechanically severed from all contact or connection with the scale mechanism proper.

From this simple explanation it will be understood that without doubt many means could be devised to accomplish this result, and that the specific means shown is merely typical of a suitable means for this purpose.

Within the base 2 are suitable scale levers 6 and 7 which are hung to the base at their ends upon suitable depending links 8 and knife edge bearings 9 and are linked together at their middle portions by a link 10 in a manner common to such scales.

The platform 3 is provided with depending rigid posts 11 which rest upon suitable V-shaped anti-friction projections or supports 12 rigid with said levers in the usual manner.

The weight lever 6 has a central projection 13 extending from its rear end to the rear part of the base 2, the rear end of this projection 13 being linked to suitable weight indicating mechanism within the upper part of the casing by a tension rod 14.

While any suitable weight indicating mechanism might be made use of to indicate the weight upon the platform, I prefer to use the weight indicating mechanism particularly illustrated in Figure 2. This weight indicating mechanism comprises a light frame work 15 connected to the upper end of the rod 14, the rod 14, being connected to a lower cross bar 16 of the frame 15. The frame 15 has an upper cross bar 17 which is connected by two tension counter-balancing springs 18 to an evener bar 19 which is pivotally connected at its transverse center to the depending end 20 of a bar 21 which is supported upon a rigid cross bar 22 in the casing 4 by means of a depending rigid support 23 carried by said cross bar. The rear end 24 of the bar 21 is adjustable by means of a screw 25 threaded through a suitable opening in the bar 22 for adjusting the tension of the springs 18.

The bar 22 is adjustably mounted in the casing 4 by means of brackets 26 and bolts 27 so that the pivotal connection 28 of the evener 19 of the bar 21 may be positioned in reference to the rest of the mechanism so that the weight indicating mechanism will operate freely.

Below the counterbalancing springs 18 I arrange a suitable dash pot 28 connected with the weight indicating mechanism to prevent sudden or destructive movement thereof.

On the upper end of the casing 4 I arrange a housing 29 within which I arrange the advertisement display device 5 and also a weight indicating disk 30 provided with an inclined periphery 31, a portion of which can be seen through a suitable sight opening 32 in the front of the housing 29.

The disk 30 is rigidly mounted on the upper end of a vertical shaft 33 carried in suitable bearings in a frame 34 supported on said cross bar 22.

For rotating the disk 30 to indicate the weight on the platform, I provide a small bevel wheel 35 rigidly mounted on the vertical shaft 33 and meshing with a similar bevel wheel 36 carried on a horizontal shaft 37 which also carries a suitable spur gear 38 with which a rack 39 meshes. Said rack 39 is vertical and is carried upon the upper end of an operating rod 40 which is connected at its lower end with said cross bar 17. By this means the disk 30 is rotated from the zero point to a position to indicate the weight of any article placed upon the platform, the weight indications being arranged in the form of a scale on the said inclined periphery 31, a suitable indicator or arrow 41 being arranged at the middle of said sight opening 32.

To prevent the slack or clearance in the various connections affecting the weight indications, I provide means for holding the disk in one direction to take up any slack or clearance, which means consists in a weight 42 guided in a tubular guide 43 and connected by a cord 44 running over a pulley 45 to the shaft 33, said cord being wound upon a threaded cylinder 46 carried on said shaft so that the change in the height of the weight 42 will not affect the accuracy of the weight indications.

The advertising display device 5 comprises a plurality of rotatable members 47 arranged in the front part of the casing 29.

As shown, these advertising display members are triangular in cross section, having three faces 48 upon which advertisements can be displayed and which are long enough to extend across the casing 29 which is open at its front to display the advertisements. In the form shown there are 4 of these devices 47 arranged horizontally and one above the other, and the sight opening 32 is arranged between the two center devices 47. Each of these devices 47 is mounted upon a horizontal shaft 49 for rotation and on each shaft is provided a small pinion 50 meshing with a gear 51 carried within the casing 29 and by which the device 47 can be rotated.

I provide a series of these gears 51 arranged in a vertical row and operatively connected by interposed pinions 52 so that when the lower gear 51 is rotated the several gears and the several devices 47 will likewise be rotated.

I intend that one of the faces 48 of each of the several devices 47 shall be arranged in a common vertical plane in the front part of the casing 29 when the device is at rest to properly display the advertisements and to assure the members 47 being thus held stationary I provide a setting cam 53 on each shaft 49 having three depressions 54 adapted to receive a cam roller 55 carried on a pivoted lever arm 56 and which arm is held by a spring 57 so as to hold the cam roller 55 against the cam 53 and adapted to enter the several depressions to hold and set the display member 47 in the proper position to hold one of its faces in the common vertical plane.

For rotating the lower gear 51 to change the positions of the several display devices 47 to successively display the several advertisements carried thereby, I provide a horizontal shaft 57' carrying a pinion 58 in mesh with said lower gear 51 and mounted in suitable bearings in the housing 29.

For rotating said shaft 57' I provide a vertical push rod 59 extending down through the casing 4, the lower end 60 thereof depending into the rear part of the base 2.

Said rod is free to drop a certain distance but is held against dropping further by means of a collar 61 which is adapted to contact with a guide member 62 mounted on a base or floor plate 63 in the casing 4.

I provide suitable mechanism so that when the rod 59 is lifted it will rotate the shaft 57 far enough to cause the several devices 47 to rotate far enough to change from one advertisement to the next in succession.

For lifting said rod 59 I provide an operating lever 64 pivotally mounted at 65 between its ends upon the platform 3. This lever extends beneath the platform and through the base, having its rear end 66 disposed below the lower end 60 of the rod 59 and adapted when the forward end 67 of this lever is depressed to be lifted to contact with the said rod 59 and lift same far enough to cause the proper rotation of the shaft 57.

The pivot 65 is mounted in and projects from a longitudinal bar 65ª which is rigidly secured to the platform 3 through the medium of rigid cross bars 65ᵇ which are secured to the rigid posts 11.

As shown in Figure 3 the rear end 66 of the lever 64 is normally free of the lower end 60 of the rod 59 and is adapted to be lifted into contact therewith to perform the work of changing the advertising members 47.

For the purpose of operating the lever 64 I provide an auxiliary platform 68 upon which a person will stand in being weighed and which is movable relative to the platform proper 3 as the person steps upon the platform, being adapted to be depressed into contact with the upper surface of the platform 3 as the weight is received thereon. The auxiliary platform 68 is pivotally connected at its rear end 69 to the platform 3 proper and the forward end is held in relatively elevated position by light springs 70, arranged between the auxiliary platform 68 and the platform proper 3. For depressing the forward end of the lever 64 I provide a pivoted strut member 71 in the form of a bell crank lever pivotally mounted on a part 72 which is rigid with the auxiliary platform 68 and having a depending end 73 adapted to contact with the upper surface 67 of the lever 64 and act as a strut to depress same. The bell crank lever 61 is pivoted at its middle portion on a pivot 74 carried by the member 72. The other arm 75 of the bell crank lever 71 carries a pin 76 adapted to contact with a pin 77 rigid with and carried by the platform proper 3, as the auxiliary platform 68 descends, and which tends to rotate the bell crank lever 61 in the direction of the arrow on Figure 5 to swing the bell crank lever in a direction to carry the end 73 off of the end 67 of the lever 64, just at the time that the auxiliary platform 68 reaches the lower limit of its movement, or comes into contact with the platform proper 3. The initial downward movement of the platform 68 thus pushes down the end 67 of the lever 64 and raises the rod 59, thus effecting the operation of the advertising devices, and as the platform 68 reaches the lower limit of its relative movement the bell crank lever is swung out of contact with the rear end 67 of the lever 64 and thereafter the lever 64 is free to return to its original position and the rear end 66 thereof drops out of contact with the lower end of the rod 59. At this time the full weight is applied to the scale and the proper indication is shown by the disk 30.

For causing the shaft 57' to be rotated when the rod 59 is lifted I provide a ratchet wheel 78 on the shaft 57 and a spring pressed dog 79 on the upper end of the rod 59. The arrangement is such that when the rod 59 is raised by the movement of the lever 64 the ratchet wheel 78 is turned one tooth. The ratio of the gearing is such that this movement of the shaft is sufficient to cause the display members 47 to be rotated one third of a revolution.

It should be understood that while I have illustrated an advertising device as being the device which is operable by the rod 59, and while I have illustrated a specific means of operating the lever 64 and disconnecting the same from the movable element 59, my invention is not limited to such specific details. So far as I am aware, I am the first to provide means whereby power can be produced and used for causing the movement of some extraneous device other than the weight indicating element in connection with a scale and which is so arranged that the movable element, such as the vertical rod 59 is mechanically disconnected from the weight indicating mechanism after the operation thereof has been completed so that the accuracy of the weight indications will not be affected by any changes in the power necessary to operate the extraneous device, but will be just as free and just as accurate in its indications as though such extraneous device was not operable by the scale in any manner.

It will also be understood that my invention is not limited to the use of an auxiliary platform which is movable relatively to the platform proper, but it will be clear to those versed in the art that various modifications of means for operating the lever 64 and causing the mechanical disconnection thereof from the movable element 59 might be made use of, and consequently I do not limit nor confine my invention to the specific structures or devices or combinations thereof herein illustrated and described.

I claim:

1. The combination with a platform scale, of a member to be moved, a platform upon which the weight is placed, scale levers upon which the platform is supported, means yieldingly holding the platform in elevated position relatively to the levers, an operating lever pivotally mounted between its ends upon the platform, one end of the operating lever arranged to contact with said member for moving same, means carried by the platform for engaging said lever to move the same on its pivot for moving said member as the weight is applied to the platform, and means for automatically releasing the lever when the lever has performed its function, the operating lever being adapted to drop free of said member when released.

2. The herein described improvement comprising a platform scale having a receiving platform, means for yieldingly holding said receiving platform in an elevated position, a member to be moved, member operating means operable by the descent of the receiving platform for engaging and moving said member, means for releasing the operating means as the platform substantially reaches the lower limit of its movement, said operating means adapted to automatically move out of contact with said member when released.

3. A weighing scale having a platform and supporting levers beneath the platform, in combination with spring means yieldingly holding the platform in elevated position, a member to be lifted, an operating lever pivotally mounted between its ends on the platform and having an end arranged beneath said member, a swinging strut carried by the platform adapted to engage the other end of the operating lever to force it down as the platform is initially forced down by a weight, means for releasing the lever from the strut as the platform approaches the lower limit of its movement, said lever adapted to drop free of said member when released.

4. A weighing scale having a platform and supporting levers beneath the platform, in combination with a foot plate, spring means yieldingly holding said foot plate in elevated position, a member to be lifted, an operating lever pivotally mounted between its ends on the platform and having an end arranged beneath said member, a swinging strut carried by the foot plate adapted to engage the other end of the operating lever to force it down as the plate is initially forced down by a weight, means for releasing the lever from the strut as the plate approaches the lower limit of its movement, said lever adapted to drop free of said member when released, and said strut adapted to return freely to lever engaging position as the plate is lifted upon the removal of the weight.

5. A weighing scale having a platform and supporting levers beneath the platform, in combination with a rod to be lifted, an operating lever pivotally mounted between its ends upon said platform, one end being heavier than the other and extending beneath said rod for contact therewith, means yieldingly holding a part of the platform in a relatively elevated position, lever operating means carried by said part adapted to engage the lighter end of the lever and force it down as said part is initially forced down by an applied weight and lift said rod, means for releasing the operating lever from said lever operating means as said platform part reaches the lower limit of its relative movement, the lever adapted to move out of contact with said rod when released.

6. A weighing scale having a platform and a supporting lever beneath the platform, in combination with a rod to be lifted, an operating lever pivotally mounted between its ends upon said platform, one end being heavier than the other and extending beneath said rod for contact therewith, a foot plate on the platform, means yieldingly holding the foot plate in a relatively elevated position, lever operating means carried by the foot plate adapted to engage the lighter end of the lever and force it down as the foot plate is initially forced down by an applied weight and lift said rod, means for releasing the operating lever from said lever operating means as the foot plate reaches the lower limit of its relative movement, the lever adapted to move out of contact with said rod when released, and said lever operating means adapted to return to lever engaging position as the foot plate is released from the applied weight.

7. The herein described improvement comprising, an automatic platform scale having a receiving platform, an associated operable device having an element to be moved, means yieldingly holding the platform in a relatively elevated position, means associated with the platform for moving said element upon the initial depression of the platform due to an applied weight, and means for severing connection between the element and the platform as the platform reaches the lower limit of its movement to permit the scale to accurately register the applied weight.

8. The herein described improvement comprising, an automatic platform scale having a receiving platform, an associated operable device having an element to be moved, means yieldingly holding the platform in a relatively elevated position, means associated with the platform for moving said element upon the initial depression of the platform due to an applied weight, and means for severing connection between the element and the platform as the platform reaches the lower limit of its movement to permit the scale to accurately register the applied weight, and means for automatically resetting said element operating means as the platform rises upon the removal of the weight.

Signed at Chicago, Illinois, this 7th day of September, 1920.

MATHIAS J. WEBER.